(12) United States Patent
Cristo, Jr. et al.

(10) Patent No.: US 6,941,890 B1
(45) Date of Patent: Sep. 13, 2005

(54) UNDERGROUND MARKING SYSTEMS AND METHODS FOR IDENTIFYING A LOCATION OF AN OBJECT UNDERGROUND

(76) Inventors: Michael P. Cristo, Jr., 20 Old Troy Rd., East Greenbush, NY (US) 12061; Kim L. Baines, 59 Rte. 9P, Malta, NY (US) 12020

( * ) Notice: Subject to any disclaimer, the term of this patent is extended or adjusted under 35 U.S.C. 154(b) by 0 days.

(21) Appl. No.: 10/265,059

(22) Filed: Oct. 4, 2002

Related U.S. Application Data

(60) Provisional application No. 60/327,219, filed on Oct. 5, 2001.

(51) Int. Cl.$^7$ ............................................. G01D 21/00
(52) U.S. Cl. .................... 116/209; 116/201; 116/200
(58) Field of Search ........................ 116/209, 201, 200, 116/DIG. 14

(56) References Cited

U.S. PATENT DOCUMENTS

| | | | | |
|---|---|---|---|---|
| 2,610,548 | A | * | 9/1952 | Isenberg ...................... 359/553 |
| 2,773,470 | A | * | 12/1956 | Alger ........................... 116/209 |
| 2,971,206 | A | * | 2/1961 | Linn ............................... 441/7 |
| 3,059,732 | A | * | 10/1962 | Hammack .................... 52/103 |
| 3,204,355 | A | * | 9/1965 | Whitman ..................... 40/660 |
| 3,511,210 | A | * | 5/1970 | Layman ....................... 116/209 |
| 3,523,515 | A | * | 8/1970 | Brown ......................... 116/209 |
| 3,568,455 | A | * | 3/1971 | McLaughlin et al. .... 405/184.4 |
| 3,927,637 | A | * | 12/1975 | Sammaritano ............... 33/1 H |
| 4,516,069 | A | * | 5/1985 | Schmanski ................. 324/71.1 |
| 4,571,118 | A | * | 2/1986 | Schmanski ................... 404/10 |
| 4,991,536 | A | | 2/1991 | Moshofsky |
| 5,044,303 | A | * | 9/1991 | Culver, Jr. .................. 116/209 |
| 5,072,940 | A | * | 12/1991 | Bailey ......................... 473/150 |
| 5,467,729 | A | * | 11/1995 | Yamada et al. ............. 116/209 |
| 5,501,170 | A | * | 3/1996 | Walsh .......................... 116/209 |
| 5,603,282 | A | * | 2/1997 | Tsipris ......................... 116/209 |
| 5,771,835 | A | * | 6/1998 | Schneider ................... 116/209 |
| 5,862,774 | A | * | 1/1999 | Moss ........................... 116/200 |
| 5,897,755 | A | * | 4/1999 | Star et al. ............. 204/196.06 |
| 5,943,784 | A | * | 8/1999 | Hiramine ..................... 33/293 |
| 6,095,081 | A | * | 8/2000 | Gochenour ................. 116/209 |

(Continued)

OTHER PUBLICATIONS

Farwest Corrosion Control, General Identification Markers by Carsonite, 8 pages.

(Continued)

*Primary Examiner*—G. Bradley Bennett
*Assistant Examiner*—Tania Courson
(74) *Attorney, Agent, or Firm*—Heslin Rothenberg Farley & Mesiti P.C.

(57) ABSTRACT

An underground marking system for marking buried objects is constructed from synthetic, brightly colored materials, which provides redundant horizontal and vertical markers and the ability to trace back to the buried object. The system is economical and easily installed. In one embodiment, the system includes a base disposable adjacent to the object, a hollow member having a lower end attachable to the base. The upper end is disposable adjacent to the ground. A cord is disposed in the hollow member and extends from the lower end to the upper end of the hollow member. The system provides a way of easily locating the marker either above or immediately below the ground surface. The hollow member may include a calibrated marking system to identify the depth to either the base or the buried object from the point of discovery of the hollow member.

47 Claims, 2 Drawing Sheets

U.S. PATENT DOCUMENTS

| | | | | |
|---|---|---|---|---|
| 6,142,882 A | * | 11/2000 | Anglea | 473/150 |
| 6,218,840 B1 | * | 4/2001 | Warren | 324/326 |
| 6,505,575 B1 | * | 1/2003 | Ciari | 116/209 |
| 6,575,115 B2 | * | 6/2003 | Lake | 116/200 |
| 2004/0060500 A1 | * | 4/2004 | Parkhill et al. | 116/209 |

OTHER PUBLICATIONS

Carsonite International, Utility Products Catalog, 37 pages, including Cathod-O-Flex, Trace-O-Flex, Tuffcat, and Service Marker with Tracer Utility Markers, pp. 16-19, (1999).

* cited by examiner

US 6,941,890 B1

UNDERGROUND MARKING SYSTEMS AND METHODS FOR IDENTIFYING A LOCATION OF AN OBJECT UNDERGROUND

CROSS REFERENCE TO RELATED APPLICATION

This application claims priority from U.S. provisional patent application 60/327,219, filed Oct. 5, 2001, the entire contents of which is incorporated herein by reference.

FIELD OF THE INVENTION

This invention relates generally to underground markers, and more particularly, to underground marking systems and methods for locating objects underground.

BACKGROUND OF THE INVENTION

Conventionally, markers have been placed on the surface of the ground to identify the location of underground utilities, services, or other objects. For example, markers such as poles have been buried along-side or over the location of a utility line, a pipe, or another object in an attempt to allow relocation of the utility line, the pipe, or the object when necessary. A drawback with such markers is the lack of widespread uniformity so that such markers are typically only useful to the individual that installed the marker.

There is a need for further underground markers and methods for identifying the location of buried objects.

SUMMARY OF THE INVENTION

The present invention provides in a first aspect, an underground marking system for locating an object below a surface of the ground. The underground marking system includes a base disposable adjacent to the object, and an elongated member having a lower end attachable to said base and an upper end disposable adjacent to the ground.

The present invention provides in a second aspect, an underground marking system for locating an object below a surface of the ground. The underground marking system includes a base disposable adjacent to the object, and a weather resistant cord having a lower end attachable to the base through a plurality of apertures in the base, and an upper end disposable adjacent to the ground. The cord includes at least one of indicia for identifying a distance from at least one of the base and the object, and a color based on the object.

The present invention provides in a third aspect, an underground marking system for locating an object below a surface of the ground. The underground marking system includes a base disposable adjacent to the object, a first elongated member, and a second elongated member. A lower end of the first elongated member is attachable to the base and the upper end is disposable adjacent to the ground. The second elongated member extends from the lower end to the upper end of the first elongated member.

The present invention provides in a fourth aspect, an underground marking system for locating an object below a surface of the ground. The underground marking system includes a base disposable adjacent to the object, a hollow member, and a cord. A lower end of the hollow member is attachable to the base and the upper end is disposable adjacent to the ground. The cord is disposed in the hollow member and extends from the lower end to the upper end of the hollow member.

The present invention provides in a fifth aspect, an underground marking system for locating an object below a surface of the ground. The underground marking system includes a weather resistant base disposable adjacent to the object, a weather resistant hollow member, and a weather resistant cord. A lower end of the hollow member is attachable to the base with an upper end of the hollow member disposable adjacent to the ground. The hollow member includes indicia for identifying a distance at least one of the base and the object. The weather resistant cord is disposed in the hollow member and extends from the lower end to the upper end of the hollow member. The cord has a lower end extendable through and attachable to a plurality of apertures in the base, and an upper end extendable through the upper end of the hollow member. At least one of the cord and the hollow member has a color based on the object.

The present invention provides in a sixth aspect, a method for identifying a location of an object under a surface of the ground. The method includes attaching a lower end of an elongated member to a base, locating the base and lower end of the elongated member adjacent to the object, positioning an upper end of the elongated member adjacent to the surface of the ground, and backfilling around the object, the base, and the elongated member.

The present invention provides in a seventh aspect, a method for identifying a location of an object under a surface of the ground. The method includes attaching a lower end of a cord to a base, locating the base and lower end of the cord adjacent to the object, positioning an upper end of the cord adjacent to the surface of the ground, and backfilling around the object, the base, and the cord.

The present invention provides in an eight aspect, a method for identifying a location of an object under a surface of the ground. The method includes attaching a lower end of a hollow member to a base, attaching a lower end of a cord to a base, passing the cord through the hollow member, locating the base and a lower end of the cord adjacent to the object, positioning an upper end of the hollow member and an upper end of the cord adjacent to the surface of the ground, and backfilling around the object, the base, and the cord.

The present invention provides in a ninth aspect, a method for finding an object under the surface of the ground. The method includes locating an upper end of an elongated member adjacent to the surface of the ground to determine a horizontal position of the object, and at least one of locating indicia on the elongated member to determine a depth to the object and determining the identity of the object based on a color of the elongated member.

The present invention provides in a tenth aspect, a method for finding an object under the surface of the ground. The method includes locating an upper end of a hollow member and a cord adjacent to the surface of the ground to determine a horizontal position of the object, and at least one of locating indicia on the elongated member to determine a depth to the object and determining the identity of the object based on a color of the elongated member.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and accompanying drawings in which:

DETAILED DESCRIPTION OF THE INVENTION

The present invention is directed to underground marking systems and methods for locating underground utilities, underground services or objects which often require precise location, for example horizontally and vertically, when excavating to connect to the existing utility, excavating to service the utility, or locating an object to avoid damage when excavating in an adjacent location.

The underground marking systems may be made from synthetic or plastic materials and colored to be highly visible with recognizable color-coding and graduated depth markings or indicia. The underground marking systems are easily installed during back-fill of an excavation and are highly visible and easily discovered when attempting to relocate the underground marking systems and the buried objects before damage occurs to the buried objects.

The underground marking systems and methods may also incorporate redundant features so that if the underground marking system is damaged during excavation, for example by a backhoe, the underground marking systems still allow location the objects. Widespread adoption of the economical underground marking system and method of the present invention may provide standardized recognizable markers disposed above or adjacent to underground utilities, attachment points, valves, or other important reference points which can be clearly identified and readily uncovered, for example, during excavation.

Figure 1:
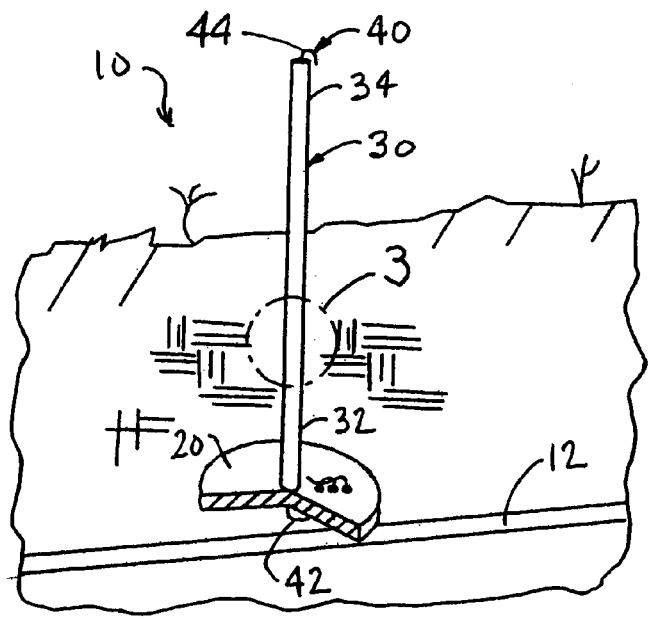
FIG. 1 is a perspective view of an underground marking system in accordance with the present invention.
Figure 2:
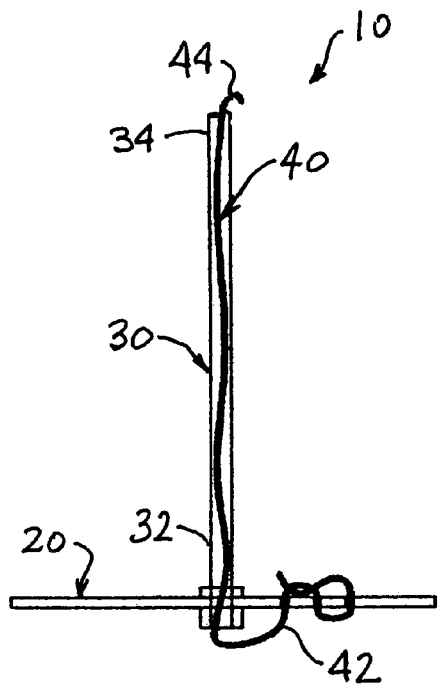
FIG. 2 is a side elevational view, partially cut away, of the underground marking system of FIG. 1.

FIGS. 1 and 2 illustrate an underground marking system 10 in accordance with the present invention. The underground marking system may be used to mark the location of a buried object, such as a natural gas pipe 12, either temporally or permanently.

Underground marking system 10 generally includes an anchor or base 20, a first elongated member such as a hollow member 30 having a lower end 32 and upper end 34. Lower end 32 is attachable to base 20. A second elongated member such as a cord 40 is extendable through hollow member 30 and a lower end 42 of cord 40 is attachable to base 20. An upper end 44 of cord 44 40 is disposed adjacent upper end 34 of hollow member 30.

Base 20 may be placed on or immediately above the object with hollow member 30 attached to base 20 and extending vertically upward above the ground surface to indicate a horizontal location of the object. Alternatively, upper end 34 of hollow member 30 may be dispose below the ground surface (not shown in FIG. 1) to mark the location of the buried object. Base 20 may be size and shaped to allow it to be attached to the hollow member so that the hollow member cannot be pulled from the ground if encountered and caught by a hydraulic excavator bucket.

For example, the base may comprise a disc-shaped member having a diameter of about 4 inches to about 12 inches, and preferably about 6 inches to about 8 inches. The thickness of the base may be about ⅜ inch to about 1 inch, and preferably about ½ inch to about ¾ inch. Base 20 may be formed from a plastic material such as PVC (polyvinyl chloride) or other suitable weather resistant material or materials having a weather resistant coating.

Figure 3:
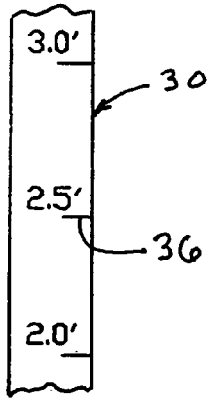
FIG. 3 is an enlarged view of detail 3 of FIG. 1 illustrating the measurement markings on the hollow member.

As best shown in FIG. 3, hollow member 30 may be a hollow vertical marking pole having indicia or graduations 36 in standard depth units disposed on an outer surface of the hollow member to indicate the distance or depth to the top of the buried object or to the base. Hollow member 30 may also be formed from a plastic material such as a PVC (polyvinyl chloride) pipe or formed from any suitable plastic tube or pipe. Other hollow tubes or pipes formed from weather resistant materials or materials having a weather resistant coating may also be used. For example, suitable tubes or pipes may include hollow square or rectangular-shaped tubes or pipes. The indicia may be printed on the hollow member or included on sticker(s) which are attached to the hollow member.

Hollow member 30 may also be color coded and/or otherwise marked to provide a clear representation of the object being marked and/or identified with the owner of the object. For example, the color of the hollow member may be red for electric, yellow for gas, oil, or steam, orange for communications or cable television, blue for water, green for sewage, pink for survey markers, white for proposed excavation, and brown or other appropriate color for abandoned underground structures or anthropological excavations. Other colors of the tube may include fuscia, coral, or other highly visible colors to universally designate that an object is buried. The hollow member itself, a label, a tag, a sealed cylinder (not shown) may be attached to the hollow member such as disposed inside the hollow member, to allow the addition of a written description defining, for example, the marked object and/or the owner of the utility company. A cap (not shown) may also be provided to seal the top of the hollow member.

With reference again to FIGS. 1 and 2, a cord may be sized to be received in and disposed within a conduit or passageway formed in hollow member 30. Cord 40 may be a colored plastic twisted or braided cord which may be highly visible if the hollow member breaks during excavation or is otherwise damaged. For example, the cord may be red for electric, yellow for gas, oil, or steam, orange for communications or cable television, blue for water, green for sewage, pink for survey markers, white for proposed excavation, and brown or other appropriate color for abandoned underground structures or anthropological excavations. Other colors of the cord may include fuscia, coral, or other highly visible colors to universally designate that an object is buried. The cord may also be an electrical insulator, eliminating concern for electrical damage, interference or corrosion of the marker.

Figure 4:
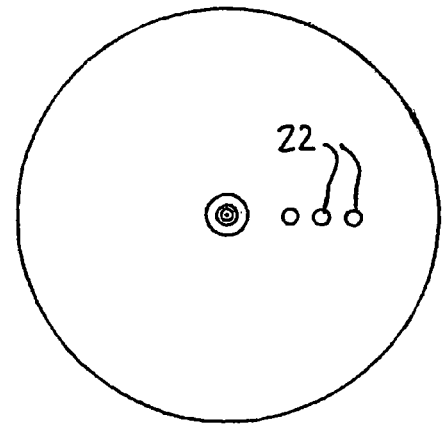
FIG. 4 is a top view of the base of FIG. 1.
Figure 5:
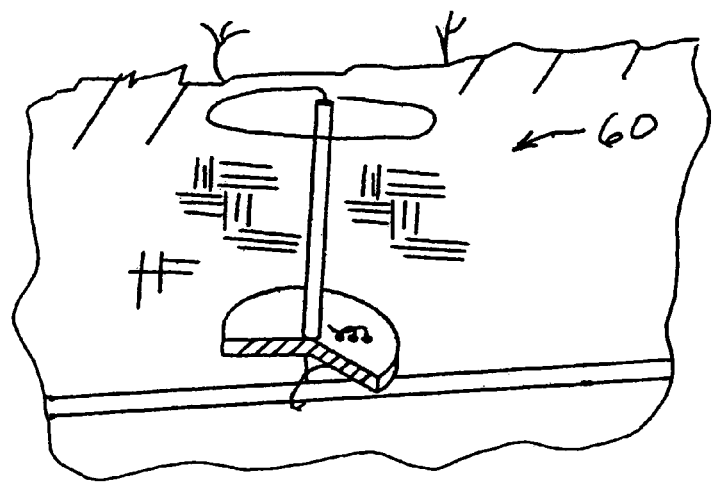
FIG. 5 is a perspective view of another underground marking system of in accordance with the present invention.

Cord 40 may be designed to be weather resistant and stronger than hollow member 30 and attached to base 20 to ensure that it is not pulled away or otherwise lost during excavation. Cord 40 provides a direct and certain visual trace to the buried object. Cord 40 may be terminated or attached directly to base 20 by threading lower end 32 through termination holes or apertures 22, best shown in FIG. 4, and back through itself. Cord 40 may also pass around the underground object 12 and then be attached to base 20, for example, as illustrated in an underground marking system 60 in accordance with the present invention, as shown in FIG. 5. Assembly of the hollow member, the cord, and the base may be accomplished by inserting the cable and hollow member into holes in the base which allow attachment without adhesives. For example, the hollow member and base may be threadably attachable together.

As shown in FIG. 5, if the underground marking system 60 is placed beneath the ground surface for long term marking purposes, the cord may be extended in a large diameter loop below the ground surface to facilitate ease of discovery. The large diameter loop provides a large search area when attempting to relocate the marker. Alternatively, a second base can be affixed at the top of the hollow member just below the surface to aid in future probing of the area.

In operation, the base of the underground marking system is buried either adjacent to or immediately above the underground object. An appropriate length of brightly colored and/or approximately calibrated hollow member is affixed to the base by either a mechanical or a solvent weld connection. The top of the hollow member extends above the ground surface for discovery in the near future, or to just below the ground surface for long term protected marking. The base provides sufficient anchoring strength to ensure the vertical hollow member is not pulled from the ground or pushed deeper if disturbed by a hydraulic excavator or other excavation equipment. A colored multi-fiber inert cord is placed through the center of the vertical hollow member and attached to the base and/or to the buried object. The underground marking system is placed at the desired depth and soil is backfilled around the underground marking system and compacted back to the final grade.

When excavating the buried object, either the vertical hollow member or the cord is first encountered which alerts the excavator that a buried object is present in the excavation area. If the vertical hollow member is broken and removed by the excavator, the cord will remain and provide a highly visible intact trace route back to the remainder of the vertical hollow member. In addition, the colored cable provides a warning to the excavator to proceed with caution to the depth of the buried object. Once the remaining section of the vertical hollow member is uncovered, markings on the side of the hollow member indicate the type of object (e.g., by color) and the depth to the object below the point of observation. Markings may also indicate the owner of the buried object, company codes and appropriate contact information.

Figure 6:
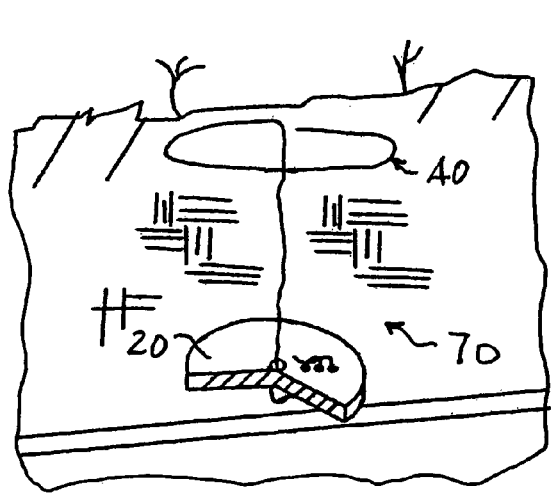
FIG. 6 is a perspective view of another underground marking system of in accordance with the present invention.
Figure 7:
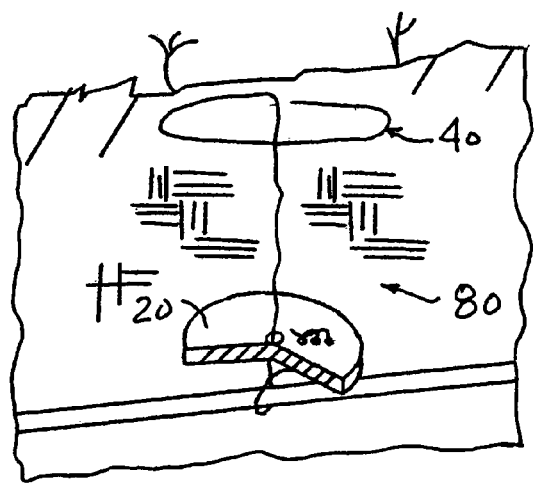
FIG. 7 is a perspective view of another underground marking system of in accordance with the present invention.

FIGS. 6 and 7 illustrate underground marking systems 70 and 80, receptively, in accordance with the present invention. Underground marking systems 70 and 80 may generally include a base 20 and a cord 40 having an end attached to base 20. Cord 40 is designed to be a highly visible to provide a long lasting signal that an underground object has been marked at the location. Even without the use of a hollow member having vertical measurement indicia, the underground marking systems provide a direct and certain visual trace to the buried object. From the present description, it will be appreciated by those skilled in the art that indicia or graduations in standard depth units may be indicated on the cord itself to indicate the depth from the top of the buried object from the depth at which it is encountered.

The underground marking systems of the present invention provide a low cost reliable means of marking underground objects by providing an immediate identification of the location and/or the depth to the buried object. It will also be appreciated that the first elongated member and the second elongated member may include other suitable configurations and materials. For example, the first elongated member may be a solid elongated member and the second elongated member may be a cord with is attached to the outer surface of the solid elongated member.

Thus, while various embodiments of the present invention have been illustrated and described, it will be appreciated by those skilled in the art that many changes and modifications may be made thereunto without departing from the spirit and scope of the invention.

What is claimed is:

1. A method for identifying a location of an object under a surface of the ground, the method comprising:
   attaching a lower end of a hollow member to a base;
   attaching a lower end of a cord to the base, the cord consisting of nonconductive material;
   passing the cord through the hollow member;
   locating the base and the lower end of the cord adjacent to the object below the surface of the ground;
   positioning an upper end of the hollow member and an upper end of the cord adjacent to the surface of the ground; and
   backfilling around the object, the base, and the cord to the surface of the ground.

2. The method of claim 1 further comprising selecting at least one of the cord and the hollow member having a color based on the object.

3. The method of claim 1 further comprising indicating on the hollow member indicia for indicating the distance from at least one of the base and the object.

4. The method of claim 1 further comprising selecting the cord having a color based on the object, and indicating on the hollow member indicia for indicating the distance from at least one of the base and the object.

5. The method of claim 1 further comprising indicating on at least one of the end of the cord and the end of the hollow member a description of the object.

6. The method of claim 1 wherein the attaching comprises passing a lower end of the cord through a plurality of apertures in the base.

7. The method of claim 1 further comprising passing the cord around the object.

8. The method of claim 1 further comprising forming the upper end of the cord into a loop under the surface of the ground.

9. The method of claim 1 wherein the hollow member comprises a rigid hollow member and the base comprises a rigid base.

10. The method of claim 9 wherein the base extends laterally from the hollow member.

11. The method of claim 10 wherein the hollow member comprises indicia for indicating the distance from at least one of the base and the object, and indicia for describing the object.

12. The method of claim 11 wherein the base extends laterally from the hollow member about 2 inches to about 6 inches and the base comprises a thickness of about $3/8$ inch to about 1 inch.

13. The method of claim 1 wherein the cord comprises plastic.

14. The method of claim 1 wherein the cord comprises braided plastic.

15. The method of claim 1 wherein the cord is freely movable relative to the hollow member.

16. The method of claim 1 wherein the base comprises a disc-shaped member.

17. The method of claim 1 wherein the base comprises a disc-shaped member having a diameter of about 4 inches to about 12 inches.

18. The method of claim 1 wherein the base comprises a disc-shaped member having a diameter of about 6 inches to about 8 inches.

19. A method for finding an object under the surface of the ground, the method comprising:

locating an upper end of a hollow member and an upper end of a cord disposed in the hollow member of an underground marker adjacent to the surface of the ground to determine a horizontal position of the object disposed adjacent to a laterally-extending base attached to a lower end of the hollow member and to a lower end of the cord of the underground marker, the cord consisting of nonconductive material; and at least one of a) locating indicia on the hollow member to determine a distance to the object below the surface of the ground, and b) determining an identity of the object based on a color of the elongated member.

20. The method of claim 19 further comprising following at least one of the hollow member and the cord to the object.

21. The method of claim 19 wherein the determining comprises determining the identity of the object based on the color of the cord.

22. The method of claim 19 wherein the cord comprises plastic.

23. The method of claim 19 wherein the cord comprises braided plastic.

24. The method of claim 19 wherein the cord is freely movable relative to the hollow member.

25. The method of claim 19 wherein the base comprises a disc-shaped member.

26. The method of claim 19 wherein the base comprises a disc-shaped member having a diameter of about 4 inches to about 12 inches.

27. The method of claim 19 wherein the base comprises a disc-shaped member having a diameter of about 6 inches to about 8 inches.

28. An underground marking system for locating an object below a surface of the ground, said underground marking system comprising:

a base disposable adjacent to the object;

a hollow member having a lower end and an upper end, said lower end attached to said base and said upper end disposable adjacent to the ground; and a cord disposed in said hollow member and extending from said lower end to said upper end of said hollow member, a lower end of the cord attached to the base, said cord consisting of nonconductive material.

29. The underground marking system of claim 28 wherein said hollow member comprises indicia for identifying a distance from at least one of said base and the object.

30. The underground marking system of claim 28 wherein at least one of said hollow member and said cord comprises a color based on the object.

31. The underground marking system of claim 28 wherein said hollow member comprises indicia for identifying the distance from at least one of said base and the object, and said cord comprises a color based on the object.

32. The underground marking system of claim 28 wherein said upper end of said cord is disposable in a loop below the surface of the ground.

33. The underground marking system of claim 28 wherein said base comprises a plurality of apertures for attaching an end of said cord to said base.

34. The underground marking system of claim 28 wherein said base comprises a disc-shaped member.

35. The underground marking system of claim 28 therein said hollow member is threadably attached to said base.

36. The underground marking system of claim 28 wherein said hollow member and said cord comprise weather resistant material.

37. The underground marking system of claim 28 wherein said cord comprises plastic.

38. The underground marking system of claim 28 wherein said cord comprises braided plastic.

39. The underground marking system of claim 28 wherein said cord is freely movable relative to the hollow member.

40. The underground marking system of claim 28 wherein said base comprises a disc-shaped member.

41. The underground marking system of claim 28 wherein said base comprises a disc-shaped member having a diameter of about 4 inches to about 12 inches.

42. The underground marking system of claim 28 wherein said base comprises a disc-shaped member having a diameter of about 6 inches to about 8 inches.

43. An underground marking system for locating an object below a surface of the ground, said underground marking system comprising:

a disk-shaped base disposable adjacent to the object, said disc-shaped member having a diameter of about 4 inches to about 12 inches;

a hollow member having a lower end and an upper end, said lower end attached to said base and said upper end disposable adjacent to the ground; and a cord disposed in and freely movable in said hollow member and extending from said lower end to said upper end of said hollow member, a lower end of the cord attached to the base, said cord consisting of nonconductive plastic material.

44. The underground marking system of claim 43 wherein said cord comprises braided plastic.

45. The underground marking system of claim 43 wherein said base comprises a plurality of apertures for attaching an end of said cord to said base.

46. The underground marking system of claim 43 wherein said hollow member comprises indicia for identifying a distance from at least one of said base and the object.

47. The underground marking system of claim 43 wherein at least one of said hollow member and said cord comprises a color based on the object.

* * * * *